United States Patent Office 3,476,828
Patented Nov. 4, 1969

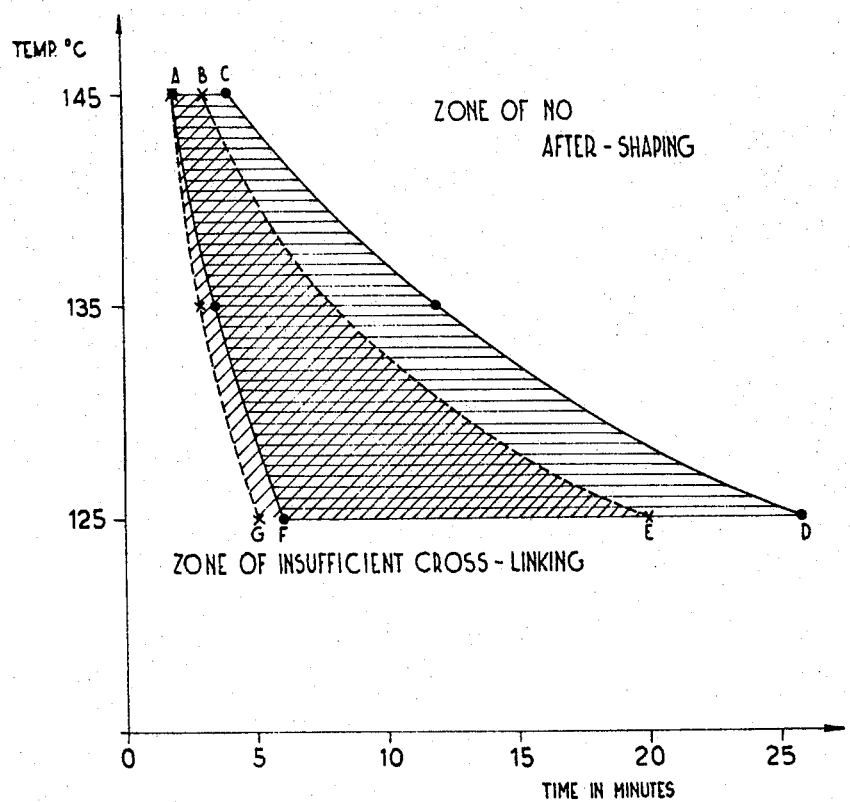

3,476,828
PREPARATION OF A MODIFIED AMINOTRI-
AZINIC RESIN AND ITS MIXTURES
Giovanni Rebaudo, Castellanza, Varese, Italy, assignor to Montecatini Edison S.p.A., Milan, Italy, a corporation of Italy
Filed June 23, 1966, Ser. No. 559,814
Claims priority, application Italy, June 24, 1965, 14,073/65
Int. Cl. C08g 9/30, 37/32
U.S. Cl. 260—849
4 Claims

ABSTRACT OF THE DISCLOSURE

Described is a process for preparing an amino-triazinic resin modified with trialkanolamines. The process comprises precondensing the trialkanolamine with paraformaldehyde in a substantially anhydrous medium and reacting this precondensate with an amino-triazine. The modified amino-triazinic resin is suitable for production of laminates.

---

The object of my invention is a process for the preparation of an aminotriazinic resin modified with alkanolamines, and its mixtures with conventional aminotriazinic resins, suitable for the production of laminates which can be molded under low pressure and after-shaped.

The preparation of known decorative laminates having high chemical and physical resistance, based on condensation resins of aminotriazines and aldehydes, particularly melamine and formaldehyde, comprises impregnation of reinforcing materials, such as paper, fabrics, glass fiber mats, with solutions of the condensation products; drying of the impregnated supports and molding these materials at temperatures between 130° and 150° C. under pressures above 30 kg./cm.$^2$.

A conventional laminate molded under high pressure consists of 4–5 kraft paper sheets impregnated with phenolic resin and of a decorative paper sheet impregnated with melamine resin. The phenolic paper sheets serve as the support for the decorative surface consisting of paper impregnated with melamine resins. The laminate thus prepared is applied by sticking the laminate onto the surface to be coated, which in many cases consists of plywood or of waste-wood panels.

The possibility of directly lining a plywood or a waste-wood panel with a decorative paper sheet impregnated with a melamine resin has been considered. This operation makes possible elimination of the sticking operation and a portion of the kraft paper support, but, however, requires low molding pressures (max. 20 kg./cm.$^2$ and in general 12 kg./cm.$^2$) since plywoods, waste-wood panels and similar materials greatly deform under high pressures. On the other hand, conventional melamine resins, when molded under pressures lower than 30 kg./cm.$^2$, because of insufficient fluidity of the resin, result in laminates showing surface irregularities, the formation of blisters, craters, etc.

From what has been stated supra, the importance of the preparation of aminotriazinic resins, which can be molded under low pressure, is self evident. Various processes for the preparation of aminotriazinic resins suitable for the preparation of laminates, which can be molded under low pressure or can be after-formed, are already known. For example, Italian Patent No. 576,065, describes the preparation of condensation products, employable for this purpose, by the use of polyvalent alcohols. Italian Patent No. 650,237, describes condensates based on aminotriazines, modified with amino-sulfonic acid and aliphatic alcohols. These methods show significant inconveniences. For example, when using amino-sulfonic acid, considerable amounts of aliphatic alcohols must be used in order to obtain resins which are sufficiently stable and can be easily spread upon the papers to be impregnated.

Melamine-formaldehyde-alkanolamine condensates in various ratios (French Patent No. 880,189) in the form of thick and very viscous pastes are also known. These products however are suitable only for the preparation of finishings for cellulose fabrics. Their methods of preparation too, in aqueous solution, substantially differ from that of the modified aminotriazinic resin of the present invention.

Applicant has found that it is possible to obtain low pressure moldable laminates in a simple and economic way by preparing an aminotriazinic resin modified with alkanolamines and mixing the resin in suitable ratios with the conventional aminotriazinic resins. These mixtures are also eminently suitable for the production of laminates that can be after-shaped.

The use of alkanolamines, due to the polarity of nitrogen therein contained, makes possible obtaining condensates having a high solubility in an aqueous medium, with or without the use of alcohols. This improved solubility allows the obtainment of less viscous syrups, the resin content being the same. Their mixtures with the normal aminotriazinic syrups (particularly with melaminic syrups), therefore have a low viscosity and allow an easier impregnation of the various types of paper for the production of laminates.

The alkanolamines used herein are tri-functional as regards the condensation. The condensation reaction can in fact take place either through the alcoholic groups or through the active hydrogens bound to the amino group. This characteristic is undoubtedly favorable in the complete curing reaction of the impregnated papers during molding, since it makes possible obtaining laminates whose surface is extremely resistant to mechanical, thermal and chemical stresses, even if the curing is carried out under low pressure.

The modified aminotriazinic resin is prepared by precondensing in a substantially anhydrous medium, formaldehyde in the form of paraformaldehyde and an alkanolamine, preferably in the ratio of 1–3.5 mols of formaldehyde per mol of alkanolamine. Various types of alkanolamines can be used for this purpose, e.g., triethanolamine, tributanolamine, etc. The condensation reaction can occur in a wide range of temperatures, but preferably between 70 and 100° C. The precondensate obtained is liquid and stable. It is mixed, while agitating and heating, with an amino-triazine (particularly melamine, but benzoguanamine, acetoguanamine, etc. can also be used) and, if necessary, with further paraformaldehyde and the condensation is carried on.

Although the molar amount of the aminotriazine is about double the alkanolamine amount, other ratios are also possible. The total amount of paraformaldehyde (by mols) is usually the double of that of the bases. This amount, however, is also not limitative.

During condensation, a certain amount of toluene can be added and the water formed in the reaction can be distilled off through the azeotrope with toluene. This, however, is not mandatory and the second part of the condensation also can be carried out in the presence of the water formed in the reaction.

The condensation is continued until the azeotropic distillation is completed or under reflux conditions for a sufficient time, such as 30–60 minutes. At the end of the condensation, the whole can be diluted with water or with water-alcohol mixtures to bring the resin content to the desired level, usually around 50%. The syrup thus obtained is clear and has a high storage life (at 20° C., from 6 to 12 months).

Due to the polarity introduced by the nitrogen in the mixture, as stated above, it has also a low viscosity (Drage viscosity from 150 to 400 cps. for a dry content around 55–60%). This low viscosity makes possible preparing mixtures with conventional aminotriazinic (more particularly melaminic) syrups having viscosities from 40 to 50 cps. which are particularly suitable for the successive impregnation operations. The modified resin can be easily diluted in water or in water-alcohol mixtures till 2–3 volumes per volume of syrup.

The mix ratios of the modified resin to the solutions of unmodified resins for rigid laminates, in order to obtain resin solutions suitable for the preparation of laminates that can be molded under low pressure or after-shaped, varies within a wide range. Mixes giving good results in the preparation of laminates that can be molded under low pressure are those in which the modified aminotriazinic resin of the present invention, is used in proportion of 3–15% by weight (dry basis) with 30–55% by weight (dry basis) of nonmodified aminotriazinic resin and 40–60 parts of water on the total weight of the mixture. Other ratios, however, are also possible.

The solutions thus prepared can be used for the impregnation of the papers and, after suitable drying, for molding of the laminates. It is not necessary to immediately use the mixtures thus prepared; they can be stored for at least three days without inconvenience, maintaining unaltered their viscosity of 40–50 cps. The molding of the impregnated papers occurs under the usual conditions of the low-pressure process, namely with pressures of the order of 12 kg./cm.$^2$, temperatures around 140° C. and molding times of about 10 minutes.

The characteristics of the laminates obtained, owing to the high functionality of the alkanolamine, are high and corresponding to those obtained with the best products molded under high pressure. A second advantageous use of the mixes hereof consists in the preparation of laminates that can be after-shaped.

The accompanying graph shows that laminates having excellent characteristics of after-shaping are obtained from this product even by using very small amounts of modifying resin.

The following examples further describe this invention but do not limit the scope thereof.

EXAMPLE 1

52.5 g. of paraformaldehyde (CH$_2$O content of 96%) and 131 g. of triethanolamine are introduced into a glass reactor provided with agitator, thermometer and reflux condenser. The mixture is heated while agitating for 30 minutes at a temperature of 80° C. 26 g. of paraformaldehyde, 117 g. of melamine and 30 cc. of toluene are then added, the temperature is increased and the mixture is subjected to azeotropic distillation in order to eliminate the H$_2$O of condensation. When the inner temperature reaches 115° C., the reaction is stopped and the mixture is diluted with water as to obtain a syrup having a dry content of about 60%.

The syrup thus obtained has a high stability (more than 6 months) at room temperature and the following characteristics:

pH—9.5.
Drage viscosity (20° C.)—300 cps.
Appearance—clear.

A mixture prepared with 20 parts of the syrup thus obtained and 200 parts of melaminic resin for rigid laminates (50% of dry matter) shows a Drage viscosity of 45 cps. with a dry matter content of about 51%.

A viscosity value of this type is considered very good for the impregnation of papers.

EXAMPLE 2

63 g. of paraformaldehyde (CH$_2$O content of 96%) and 149 g. of triethanolamine are introduced into a glass reactor provided with agitator, thermometer and reflux condenser. The reaction mixture is heated to the temperature of 80° C. while agitating for about 40 minutes. 125 g. of paraformaldehyde and 252 g. of melamine are then added; the temperature reaches 105° C. within 25 minutes. 450 g. of a water:isopropyl alcohol (50:50) mixture are then introduced. After cooling, the syrup obtained having the following characteristics is discharged:

Drage viscosity (20° C.)—400 cps.
pH—9.6.
Resin content—about 55%.

It has a stability at room temperature higher than 12 months.

23 parts of this syrup are mixed with 197 parts of a melamine-formaldehyde syrup for rigid laminates (50% of dry matter) shows a Drage viscosity of 49 cps. with a dry matter content of about 50.2%.

EXAMPLE 3

1.810 g. of paraformaldehyde (CH$_2$O content=96%) and 4.330 g. of triethanolamine are introduced in a glass reactor provided with an agitator, thermometer and reflux condenser. The reaction mixture is heated to the temperature of 80° C. while agitating for about 30 minutes. This temperature is maintained for 30 minutes and 6.920 g. of melamine are then added. The temperature is increased to 110–115° C. within 30 minutes. 5.000 g. of deionized water and 5.000 g. of ethyl alcohol are introduced and after cooling, the syrup obtained, having the following characteristics, is discharged:

Drage viscosity—156 cps.
pH—9.5.
Stability higher than 6 months at room temperature.

EXAMPLE 4

This example describes the preparation of laminated waste-wood panels. Waste-wood panels having 19–20 mm. of thickness and a specific gravity of 0.7 g./cm.$^3$ are used. They are prepared for the molding of laminates as follows:

Placed on the panel are:

(1) A kraft paper sheet impregnated with liquid phenol-formaldehyde resin for laminates (42–46 parts by weight of dry resin per 100 parts of paper).

(2) A decorative charged cellulose paper impregnated (52–55 parts by weight of dry resin per 100 parts of paper) with a mixture having the following composition:

(a) Conventional melamine-formaldehyde syrup (50% of dry matter), 197.0 parts by weight.

(b) Syrup prepared according to Example 2 (55% of dry matter), 23.0 parts by weight.

A kraft paper sheet impregnated with a liquid phenolic resin for laminates (42–46 parts by weight of dry resin per 100 parts of paper) is placed on the other side of the panel as equilibrating sheet. The superimposed layers are pressed for 12–13 minutes at 155–165° C. under a pressure of 16 kg./cm.$^2$. Before withdrawing the panel from the press, it is cooled to the temperature of 40–60° C. Laminates free of surface defects in conformity with the NEMA specifications are thus obtained.

EXAMPLE 5

This example describes the lamination of a plywood. A plywood having a thickness of 6 to 8 mm. is used. It is prepared for the molding of laminates as follows:

Placed on the plywood are:

(1) A kraft paper sheet impregnated with a liquid phenol-formaldehyde resin for laminates (42–46 parts by weight of dry resin per 100 parts of paper).

(2) A decorative charged cellulose paper, impregnated (52–55 parts by weight of dry resin per 100 parts of paper) with a mixture having the following composition:

(a) Conventional melamine-formaldehyde syrup, 225.0 parts by weight.

(b) Syrup prepared according to Example 2, 40.0 parts by weight.

The superimposed layers are pressed for 12–13 minutes at 155–165° C. under a pressure of 16 kg./cm.$^2$. Before withdrawing the sheet from the press, it is cooled to the temperature of 40–60° C.

Laminates free of surface defects in conformity with the NEMA specifications are thus obtained.

EXAMPLE 6

Two mixes having the following composition are used for the preparation of laminates which can be after-shaped.

Parts by wt.
(a) Conventional melaminic syrup (about 50% of dry matter):
  1 ---------------------------------------- 96
  2 ---------------------------------------- 90
(b) Syrup (about 55% of dry matter) prepared according to Example 2:
  1 ---------------------------------------- 4
  2 ---------------------------------------- 10

The area of after-formability was measured, on the papers impregnated with these mixtures and dried, according to the NEMA specification LP (2+2—11) under a molding pressure of 70 kg./cm.$^2$ in the temperature range between 125°–145° C. for curing times varying from 2 and 26 minutes.

The accompanying graph shows the results obtained. The zone AF EB represents the area of after-formability of the laminate prepared with mixture 1, while zone ACDG represents the area of after-formability of the laminate prepared with mixture 2. As can seen, both mixtures give laminates with very good characteristics of after-formability.

Similar results are achieved using the resins of Examples 1 and 3.

I claim:
1. A process for preparing an amino-triazinic resin modified with trialkanolamines, which comprises pre-condensing the trialkanolamine with paraformaldehyde in a substantially anhydrous medium and reacting this pre-condensate with an amino-triazine.

2. The process of claim 1, wherein the trialkanolamine is triethanolamine and the amino-triazine is melamine, adding additional paraformaldehyde to the melamine and carrying out the second part of the condensation in the presence of the reaction water.

3. A modified resin prepared according to the process of claim 2.

4. A composition, for laminates that can be after-shaped or low pressure molded, comprising a mixture of a melamine formaldehyde resin and of a resin prepared according to claim 1.

References Cited

FOREIGN PATENTS 569,042   5/1945   Great Britain.

WILLIAM H. SHORT, Primary Examiner

T. PERTILLA, Assistant Examiner

U.S. Cl. X.R.

161—261; 260—67.6